United States Patent
Limaye

(10) Patent No.: US 10,365,804 B1
(45) Date of Patent: Jul. 30, 2019

(54) MANIPULATION OF MAPS AS DOCUMENTS

(71) Applicant: Google LLC, Mountain View, CA (US)

(72) Inventor: Ashwin Limaye, Cupertino, CA (US)

(73) Assignee: Google LLC, Mountain View, CA (US)

( * ) Notice: Subject to any disclaimer, the term of this patent is extended or adjusted under 35 U.S.C. 154(b) by 578 days.

(21) Appl. No.: 14/185,355

(22) Filed: Feb. 20, 2014

(51) Int. Cl.
*G06F 3/0484* (2013.01)

(52) U.S. Cl.
CPC .................. *G06F 3/04842* (2013.01)

(58) Field of Classification Search
USPC ........................................................ 715/762
See application file for complete search history.

(56) References Cited

U.S. PATENT DOCUMENTS

| | | | | |
|---|---|---|---|---|
| 4,899,293 A * | 2/1990 | Dawson | ................. | G01C 21/00 345/423 |
| 4,998,212 A * | 3/1991 | Dedieu | ................. | G06T 17/05 345/634 |
| 5,107,342 A * | 4/1992 | Gagnon | ............... | H04N 1/2166 348/113 |
| 5,222,896 A * | 6/1993 | Smith, Jr. | ............... | G09B 27/08 434/135 |
| 5,278,946 A * | 1/1994 | Shimada | ................. | G06F 16/40 706/53 |
| 5,341,463 A * | 8/1994 | Wescott | ................. | G06T 17/05 345/423 |
| 5,469,536 A * | 11/1995 | Blank | ................. | H04N 1/3873 345/594 |
| 5,754,808 A * | 5/1998 | Tanaka | ...................... | G06F 8/24 345/629 |
| 5,945,985 A * | 8/1999 | Babin | .................. | G09B 29/106 715/209 |
| 6,414,696 B1 * | 7/2002 | Ellenby | ................... | G01C 17/34 348/E5.042 |
| 6,456,288 B1 * | 9/2002 | Brockway | ............... | G06T 15/00 345/428 |
| 7,009,619 B2 * | 3/2006 | Akitsune | .............. | G09B 29/102 345/574 |
| 7,142,196 B1 * | 11/2006 | Connor | ................ | G09B 29/106 345/173 |
| 7,353,114 B1 * | 4/2008 | Rohlf | ................... | G06F 17/2247 702/5 |
| 7,576,754 B1 * | 8/2009 | Joseph | .................... | G01C 21/32 345/619 |
| 7,636,091 B2 * | 12/2009 | Rockwood | ............. | B66D 3/006 345/419 |
| 7,746,343 B1 * | 6/2010 | Charaniya | ........... | G06F 3/04815 345/428 |
| 8,285,055 B1 * | 10/2012 | Barnes | .................... | G06T 7/337 382/108 |
| 8,453,065 B2 * | 5/2013 | Chaudhrl | ............ | G06F 3/04817 715/762 |

(Continued)

*Primary Examiner* — Kieu D Vu
*Assistant Examiner* — Alvaro R Calderon, IV
(74) *Attorney, Agent, or Firm* — Lerner, David, Littenberg, Krumholz & Mentlik, LLP

(57) ABSTRACT

In one aspect of the disclosure, a user may manipulate an electronic map so as to personalize the data contained therein. In personalizing the map, the user may alter the map as if it were a document. In particular, the user may alter the map's content and appearance using various operations such as select, copy, cut, paste, insert, find, and replace.

22 Claims, 13 Drawing Sheets

(56) References Cited

U.S. PATENT DOCUMENTS

| | | | | |
|---|---|---|---|---|
| 8,667,415 B2* | 3/2014 | Rudolph | G06F 16/958 | 715/774 |
| 8,681,175 B2* | 3/2014 | Ahn | G09B 29/106 | 345/619 |
| 8,745,529 B2* | 6/2014 | Barros | G06Q 30/0641 | 715/810 |
| 8,799,799 B1* | 8/2014 | Cervelli | G06F 3/0481 | 715/765 |
| 9,007,302 B1* | 4/2015 | Bandt-Horn | G06F 3/0202 | 345/156 |
| 9,336,695 B2* | 5/2016 | Marlow | G09B 29/008 | |
| 9,594,732 B2* | 3/2017 | Compain | G06F 17/2247 | |
| 2001/0051001 A1* | 12/2001 | Nakamura | G06T 15/20 | 382/154 |
| 2002/0013837 A1* | 1/2002 | Battat | G06F 3/0481 | 709/223 |
| 2002/0040300 A1* | 4/2002 | Eli | A01B 79/005 | 705/7.12 |
| 2002/0161469 A1* | 10/2002 | Faulkner | G05B 19/4099 | 700/118 |
| 2003/0033402 A1* | 2/2003 | Battat | G06F 3/0481 | 709/224 |
| 2003/0058238 A1* | 3/2003 | Doak | G06T 19/00 | 345/419 |
| 2004/0001114 A1* | 1/2004 | Fuchs | G01C 21/36 | 715/855 |
| 2004/0085293 A1* | 5/2004 | Soper | G06F 16/29 | 345/156 |
| 2005/0216186 A1* | 9/2005 | Dorfman | G06Q 30/018 | 701/408 |
| 2005/0268245 A1* | 12/2005 | Gipps | G06F 17/5004 | 715/762 |
| 2005/0285876 A1* | 12/2005 | Balaga | G06T 3/0062 | 345/629 |
| 2006/0009942 A1* | 1/2006 | Keck | G06Q 10/06 | 702/122 |
| 2006/0075356 A1* | 4/2006 | Faulkner | G06T 17/05 | 715/782 |
| 2006/0077208 A1* | 4/2006 | Aoki | G06T 11/001 | 345/582 |
| 2006/0215027 A1* | 9/2006 | Nonoyama | G01C 11/00 | 348/144 |
| 2007/0076920 A1* | 4/2007 | Ofek | G06T 3/4038 | 382/113 |
| 2008/0016472 A1* | 1/2008 | Rohlf | G06F 16/9537 | 715/848 |
| 2008/0069445 A1* | 3/2008 | Weber | G06T 7/12 | 382/181 |
| 2008/0077597 A1* | 3/2008 | Butler | G06F 16/9537 | |
| 2008/0192053 A1* | 8/2008 | Howell | G06K 9/0063 | 345/427 |
| 2008/0229248 A1* | 9/2008 | Fagans | H04N 1/00416 | 715/838 |
| 2009/0013273 A1* | 1/2009 | Fuchs | G01C 21/32 | 715/764 |
| 2009/0027418 A1* | 1/2009 | Maru | G06Q 30/02 | 345/629 |
| 2009/0100342 A1* | 4/2009 | Jakobson | G06F 16/29 | 715/733 |
| 2009/0119255 A1* | 5/2009 | Frank | G06F 17/212 | |
| 2009/0132316 A1* | 5/2009 | Florance | G06Q 30/06 | 701/532 |
| 2009/0177385 A1* | 7/2009 | Matas | G01C 21/3614 | 701/533 |
| 2009/0183083 A1* | 7/2009 | Hedges | G06F 3/04817 | 715/738 |
| 2009/0300528 A1* | 12/2009 | Stambaugh | G06F 3/04817 | 715/764 |
| 2009/0327071 A1* | 12/2009 | Kreft | G01C 3/08 | 705/14.49 |
| 2010/0001997 A1* | 1/2010 | Kajikawa | G06T 17/20 | 345/419 |
| 2010/0074141 A1* | 3/2010 | Nguyen | H04L 41/12 | 370/254 |
| 2010/0115455 A1* | 5/2010 | Kim | G06F 3/04815 | 715/781 |
| 2010/0115459 A1* | 5/2010 | Kinnunen | G01C 21/20 | 715/785 |
| 2010/0123669 A1* | 5/2010 | Chae | G06F 3/0488 | 345/173 |
| 2010/0146436 A1* | 6/2010 | Jakobson | G01C 21/3682 | 715/800 |
| 2010/0162124 A1* | 6/2010 | Morris | G06F 9/451 | 715/733 |
| 2010/0208033 A1* | 8/2010 | Edge | G06F 3/012 | 348/46 |
| 2010/0231581 A1* | 9/2010 | Shroads | G06T 11/206 | 345/419 |
| 2010/0256902 A1* | 10/2010 | Coch | G09B 29/10 | 701/431 |
| 2011/0007076 A1* | 1/2011 | Nielsen | G06Q 50/06 | 345/441 |
| 2011/0018902 A1* | 1/2011 | Ofek | G06T 3/4038 | 345/629 |
| 2011/0074766 A1* | 3/2011 | Page | G06T 11/203 | 345/419 |
| 2011/0137907 A1* | 6/2011 | Ikenoue | G06F 16/29 | 707/740 |
| 2011/0214050 A1* | 9/2011 | Stambaugh | G06F 3/04817 | 715/234 |
| 2011/0283223 A1* | 11/2011 | Vaittinen | G01C 21/3647 | 715/781 |
| 2011/0320116 A1* | 12/2011 | DeMaio | G01C 21/3638 | 701/457 |
| 2012/0030578 A1* | 2/2012 | Athsani | H04M 1/72522 | 715/738 |
| 2012/0278746 A1* | 11/2012 | Jetha | G06F 3/0481 | 715/770 |
| 2013/0002647 A1* | 1/2013 | Bacus | G06T 15/00 | 345/419 |
| 2013/0002648 A1* | 1/2013 | Bacus | G06F 17/248 | 345/419 |
| 2013/0007575 A1* | 1/2013 | Bacus | G06T 11/60 | 715/202 |
| 2013/0097490 A1* | 4/2013 | Kotler | G06F 17/21 | 715/255 |
| 2013/0097544 A1* | 4/2013 | Parker | G09B 29/003 | 715/771 |
| 2013/0132846 A1* | 5/2013 | Martin | G06F 3/0484 | 715/730 |
| 2013/0268886 A1* | 10/2013 | Sureshkumar | G06Q 10/025 | 715/810 |
| 2013/0298083 A1* | 11/2013 | Bertoldo | G06F 3/0482 | 715/835 |
| 2013/0325318 A1* | 12/2013 | Piemonte | G06Q 10/10 | 701/410 |
| 2013/0325341 A1* | 12/2013 | van Os | G01C 21/3611 | 701/533 |
| 2013/0339889 A1* | 12/2013 | Bastide | G06F 3/0484 | 715/770 |
| 2014/0053077 A1* | 2/2014 | Unnikrishnan | G06F 3/04815 | 715/747 |
| 2014/0101601 A1* | 4/2014 | Tang | G06F 16/29 | 715/781 |
| 2014/0200806 A1* | 7/2014 | Carnevali | G01C 21/203 | 701/533 |
| 2014/0365901 A1* | 12/2014 | Moha | G01C 21/367 | 715/738 |
| 2015/0007074 A1* | 1/2015 | Mackinlay | G06T 11/00 | 715/765 |
| 2015/0026620 A1* | 1/2015 | Kwon | G06F 3/04845 | 715/770 |
| 2015/0038161 A1* | 2/2015 | Jakobson | H04W 4/02 | 455/456.1 |
| 2015/0160838 A1* | 6/2015 | Shirabe | G06F 3/04845 | 715/765 |
| 2015/0338942 A1* | 11/2015 | Stone | G06F 3/0488 | 345/173 |

(56) References Cited

U.S. PATENT DOCUMENTS

| | | | |
|---|---|---|---|
| 2015/0354979 A1* | 12/2015 | Cengil | G01C 21/3638 701/532 |
| 2016/0161277 A1* | 6/2016 | Park | G01C 21/343 701/419 |
| 2017/0115749 A1* | 4/2017 | Li | G06F 3/0346 |

* cited by examiner

US 10,365,804 B1

MANIPULATION OF MAPS AS DOCUMENTS

BACKGROUND OF THE INVENTION

Various systems exist in which electronic map data may be accessed by and displayed to a user on a computer display. Some maps may contain more data than other maps. For example, a first electronic map may include images of the area being depicted, including images of buildings, roads, cars, and trees, while a second electronic map may simply be a graphic depiction of roadways. A user may be able to switch between one type of map and another. In addition, a user may zoom in and out of the displayed map and change views and perspectives within these maps. Objects and navigation routes may also be identified to the user within the displayed map.

BRIEF SUMMARY OF THE INVENTION

In one aspect of the disclosure, a user may manipulate an electronic map so as to personalize the data contained therein. In personalizing the map, the user may alter the map as if it were a document. In particular, the user may alter the map's content and appearance using various operations such as select, copy, cut, paste, insert, find, and replace.

One aspect of the disclosure provides for a method that may be performed by one or more computer devices. The method may include receiving a first selection of a first portion from a first map, as well as receiving a second selection indicating a second map into which the first portion from the first map is to be included. The one or more computer devices may determine a geographic location and an orientation of the first portion from the first map and identify a second portion of the second map that corresponds with the geographic location of the first portion from the first map. The method also includes incorporating the first portion from the first map into the second portion of the second map, wherein the incorporating occurs in an orientation that corresponds with the determined orientation of the first portion from the first map.

In one example, the method may include identifying one or more objects within the portion from the first map, and removing the one or more objects from the first map. In another example, the portion from the first map is selected by the user selecting an area within the first map. In yet another example, the portion from the first map is selected by the user selecting one or more objects within the first map. In still another example, the first map and the second map may be globes. The method may then include associating the portion from the first map with a conic volume having an apex located toward the center of the globe of the first map; identifying a conic volume of the second map that corresponds with the conic volume of the first map; and incorporating the conic volume of the first map into the conic volume of the second map.

In one example, the first map may be a three-dimensional map, and the first selection of the portion from the first map may include a three-dimensional volume from the first map. In another example, the incorporation of the first portion from the first map into the second portion of the second map may include removing the second portion from the second map, and replacing the second portion with the first portion from the first map. The incorporation of the first portion from the first map into the second portion of the second map may generate an altered map, which may be stored by the one or more computing devices.

Another aspect of the disclosures is a method that includes receiving a selection of one or more selected objects; receiving a request for an identification of one or more map objects within a first map; identifying the one or more map objects within the first map; receiving a request to replace the one or more map objects with the one or more selected objects; and replacing the one or more map objects with the one or more selected objects based on the received request.

In one example, the identification of the one or more map objects is based on a search query provided a user of the one or more computing devices. In another example, the replacing the one or more map objects may include determining that the one or more map objects share an association with one or more non-identified objects within the first map, and incorporating the one or more selected objects into the first map so that the one or more selected objects share the association with the one or more non-identified objects within the first map. In yet another example, the method may include replacing the one or more map objects with the one or more selected objects generates an altered map and storing the altered map as a version of the second map.

Another aspect of the disclosure provides for a system that includes one or more processors configured to: receive a first selection of a first portion from a first map; receive a second selection indicating a second map into which the first portion from the first map is to be included; determine a geographic location and an orientation of the first portion from the first map; identify a second portion of the second map that corresponds with the geographic location of the first portion from the first map; and incorporate the first portion from the first map into the second portion of the second map, wherein the incorporating occurs in an orientation that corresponds with the determined orientation of the first portion from the first map.

DETAILED DESCRIPTION

Overview

Figure 1:
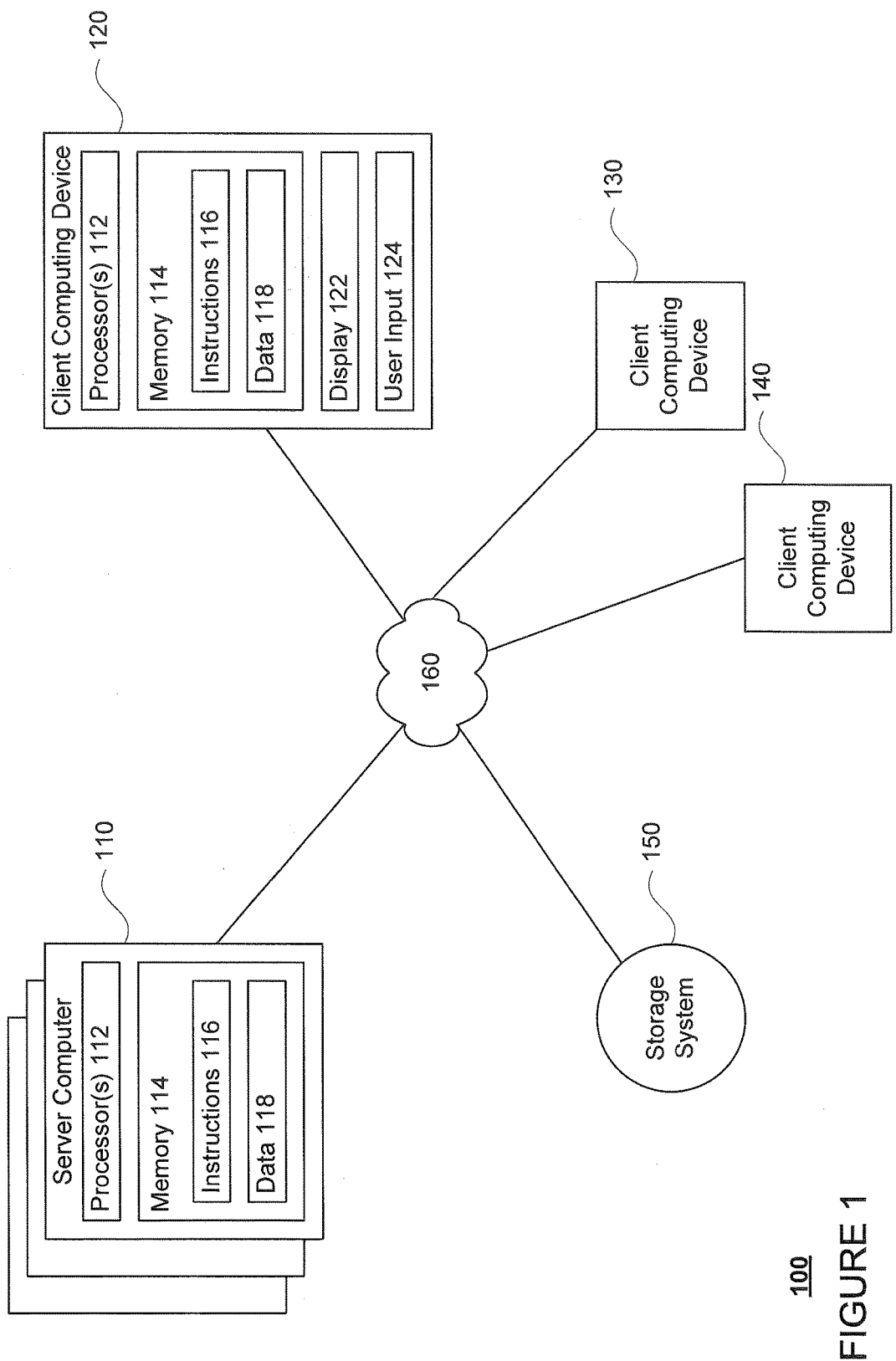
FIG. 1 shows an exemplary system for receiving, transmitting, and displaying data.

In one aspect of the disclosure, a user may manipulate an electronic map so as to personalize the data contained therein. In personalizing the map, the user may alter the map as if it were a document. In particular, the user may alter the map's content and appearance using various operations such as select, copy, cut, paste, insert, find, and replace. Each of these operations will be disclosed in greater detail below.

In one example, maps may be manipulated by a copy and paste function, in which a user may select a portion of a first map and then paste that selected portion into a second map. Copying from the first map may take the form of selecting an area on the first map, such as a polygonal or circular area. Alternatively, copying could take the form of selecting one or more objects in the first map, such as by selecting buildings, roads, or trees displayed in a 3D map.

For instance, a user may select a portion of a first map and paste the selected portion into a second map. In one example, a user may select an area of the first map using a curser and a set of commands. The selected portion may be copied so that it is stored by the user's device or on a remote device that is networked with the user's device. Information regarding the selected portion's geographic position and orientation may also be stored. The user may then paste the copied portion of the first map into the second map. In executing the paste command, a determination is made as to what geographic position and orientation within the second map corresponds to the copied portion from the first map. In this way the pasted portion from the first map may appear within the second map at the appropriate position and orientation.

Instead of copying the selected portion of a map, a user may alternatively cut the selected portion from the map. In performing a cut operation, objects within the selected area are removed from the map. In place of the removed objects, the system may display a default terrain. The default terrain may be based on a predetermined terrain type of the selected area. In one alternative, only some objects may be removed from the map in connection with a cut operation, while other objects remain on the map. For example, a road that is included in a selected area may remain as part of the map terrain, while buildings in the selected area are removed.

A user may also perform a find operation for objects within a map. For example, a user may perform a find operation for a particular road or building. A find operation for a building may be performed by the user typing the name of a building or the building's address into a search field. Alternatively, the user may use audio or image inputs in connection with the find operation.

In one aspect of the disclosure, a user may select particular objects for copying. For example a cursor may be used to select and copy a particular building from a street level view of a first map. The selected building may then be pasted into a second map. In accordance with one aspect, the user may select multiple objects before performing the copy command so that multiple objects are pasted into the second map using a single paste command.

Figure 8:
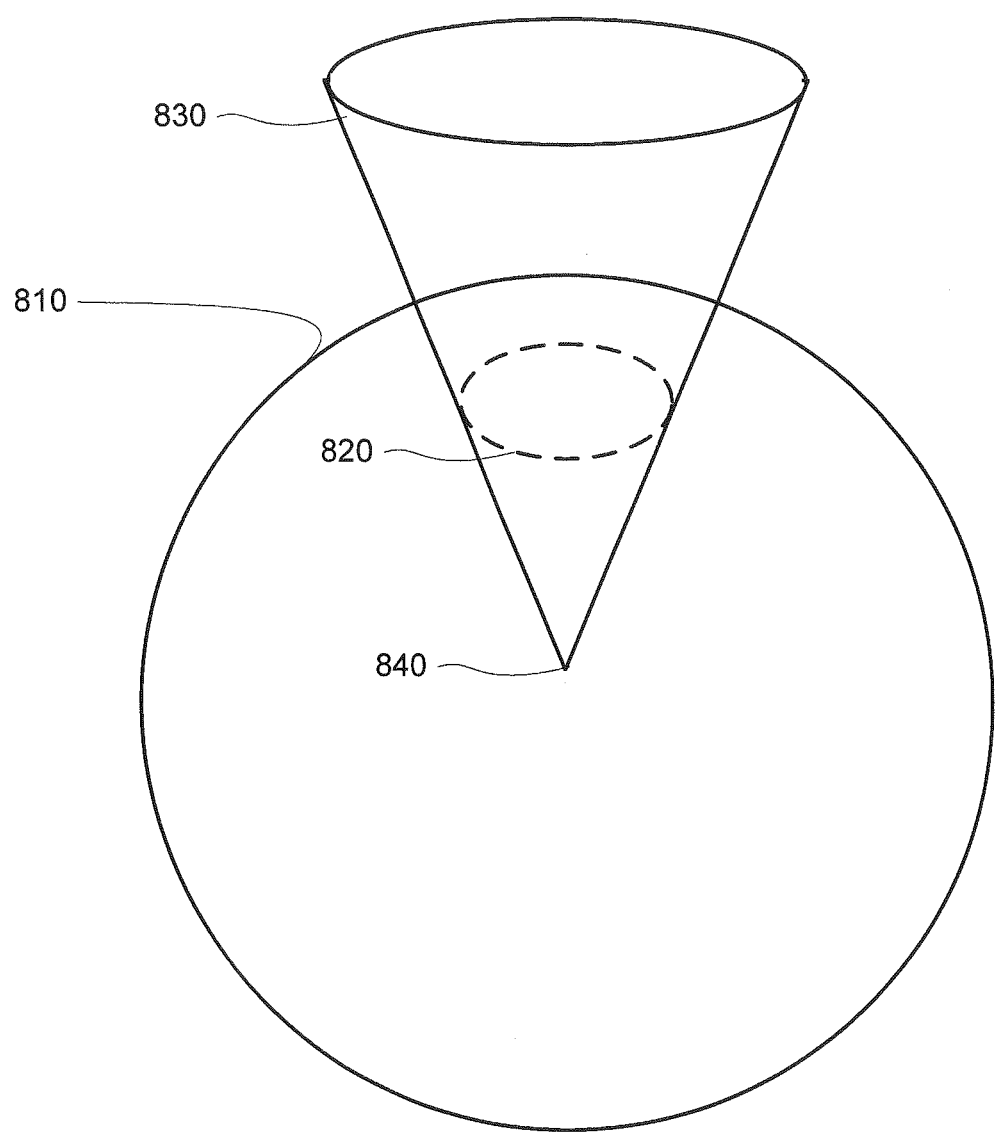
FIG. 8 shows the selection of a portion of a globe in accordance with one aspect of the disclosure.

In accordance with another aspect of the disclosure, a three dimensional volume may be copied from a first map and pasted into a second map. In one example, a user may select a two dimensional area on a map and perform a copy command that copies all map data from a three dimensional volume associated with the selected two dimensional area. In particular, FIG. 8 shows a global view of a map in which a particular two dimensional area of the map has been selected by a user. In performing a copy command for this selected area, the disclosed system may copy all of the map data that is contained within a conic volume associated with the selected area. This conic volume may have an apex at the center of the globe and may extend out infinitely from the apex.

In an alternative embodiment, a user may copy a spherical, cubic, or domed three-dimensional volume of a first map and paste the copied volume into a second map. In performing the paste command, all of map data within the corresponding volume of the second map may be replaced with map data from the first map.

Example Systems

Figure 2:
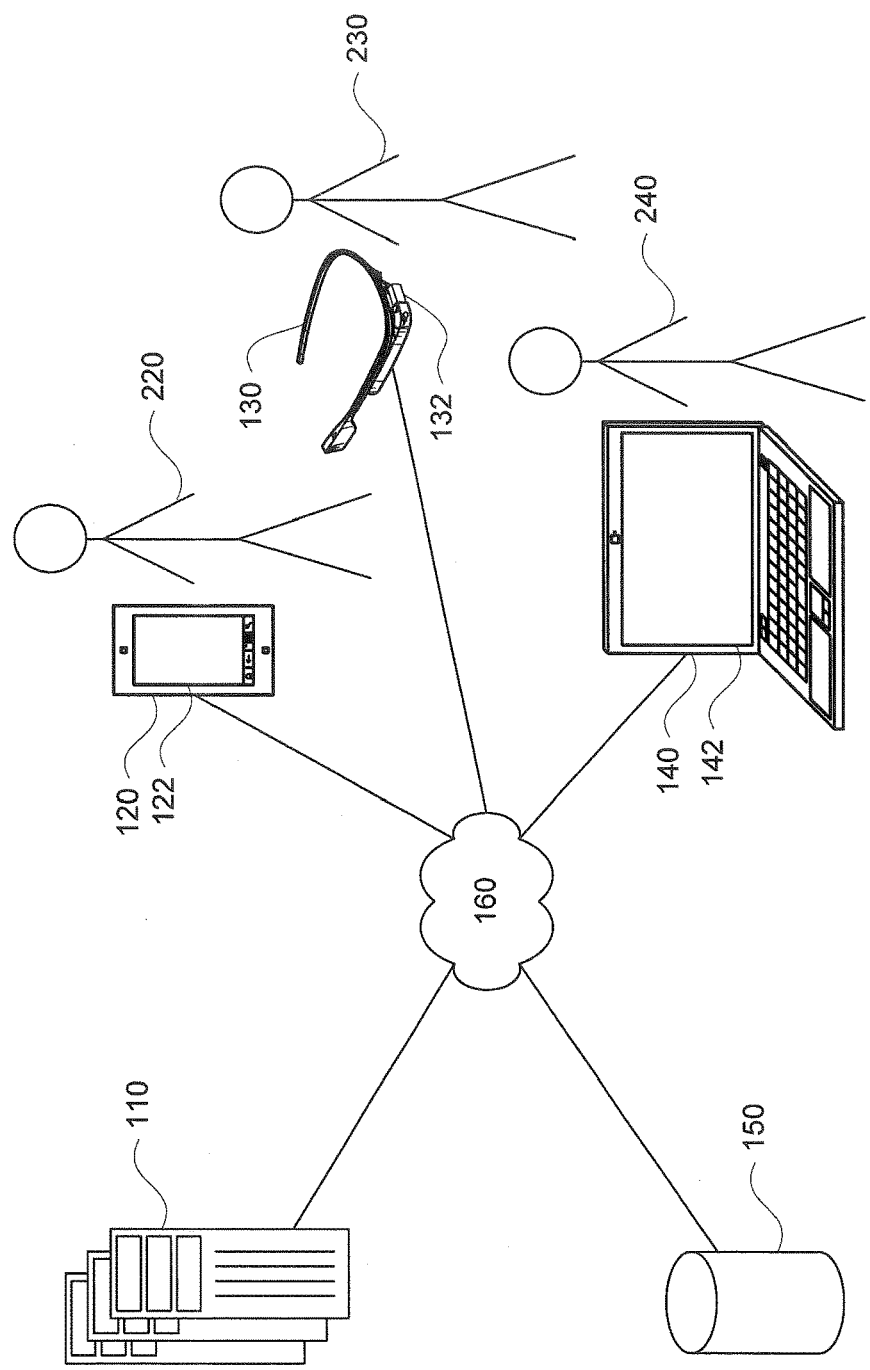
FIG. 2 shows and alternate view of the system from FIG. 1.

FIGS. 1 and 2 depict an example system 100 in which the features described above may be implemented. This example should not be considered as limiting the scope of the disclosure or usefulness of the features described herein. In this example, system 100 includes computing devices 110, 120, 130, and 140 as well as storage system 150. Computing device 110 contains one or more processors 112, memory 114 and other components typically present in general purpose computing devices. Memory 114 of computing device 110 store information accessible by processor 112, including instructions 116 that can be executed by the processor 112.

Memory also includes data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1 and 2, it should be appreciated that a typical system can include a large number of connected computing devices, with each different computing device being at a different node of the network 160.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by server computing device 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Figure 3:
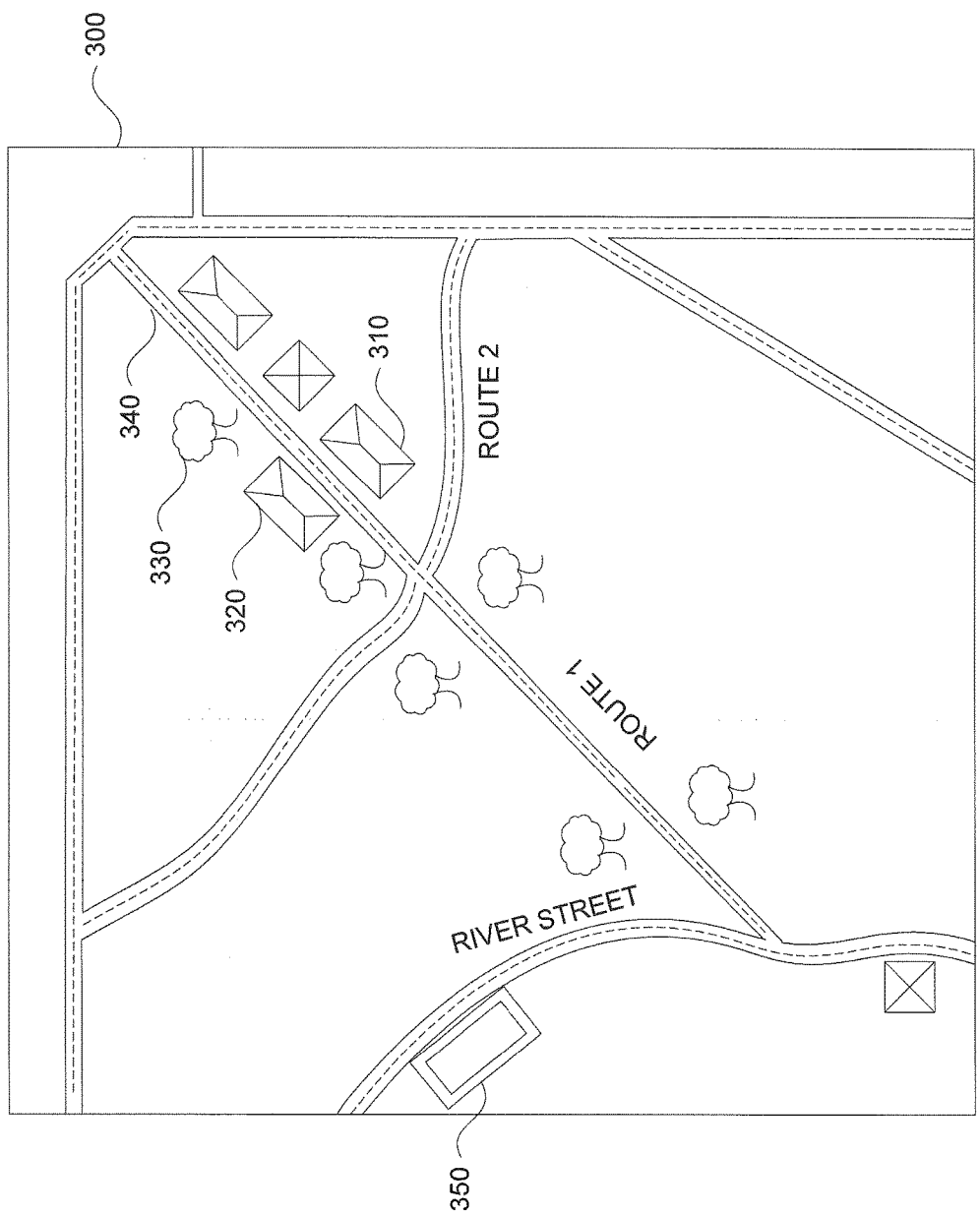
FIGS. 3 and 4 show a maps that may be stored and accessed on the disclosed system.
Figure 4:

Storage system 150, memory 114, as well as devices 120, 130, and 140 may each store map data. The stored map data may include any information that may be associated with a map. In one aspect, users 220, 230, and 240 shown in FIG. 2 may use devices 120, 130, and 140 to access one or more maps stored on storage system 150 or memory 114. For example, maps 300 and 400 shown in FIGS. 3 and 4, respectively, may be accessed by users 220, 230, or 240.

While maps 300 and map 400 correspond to the same geographic location, they do not contain identical content. In particular, map 300 includes images of trees and buildings, such as tree 330 and buildings 310, 320 and 350, while map 400 does not depict these objects. In addition, map 300 may depict some objects in a different manner than map 400. For example, map 300 may depict roads using a satellite image of the road, while map 400 depicts roads using graphics that are not based on captured images.

Figure 5:
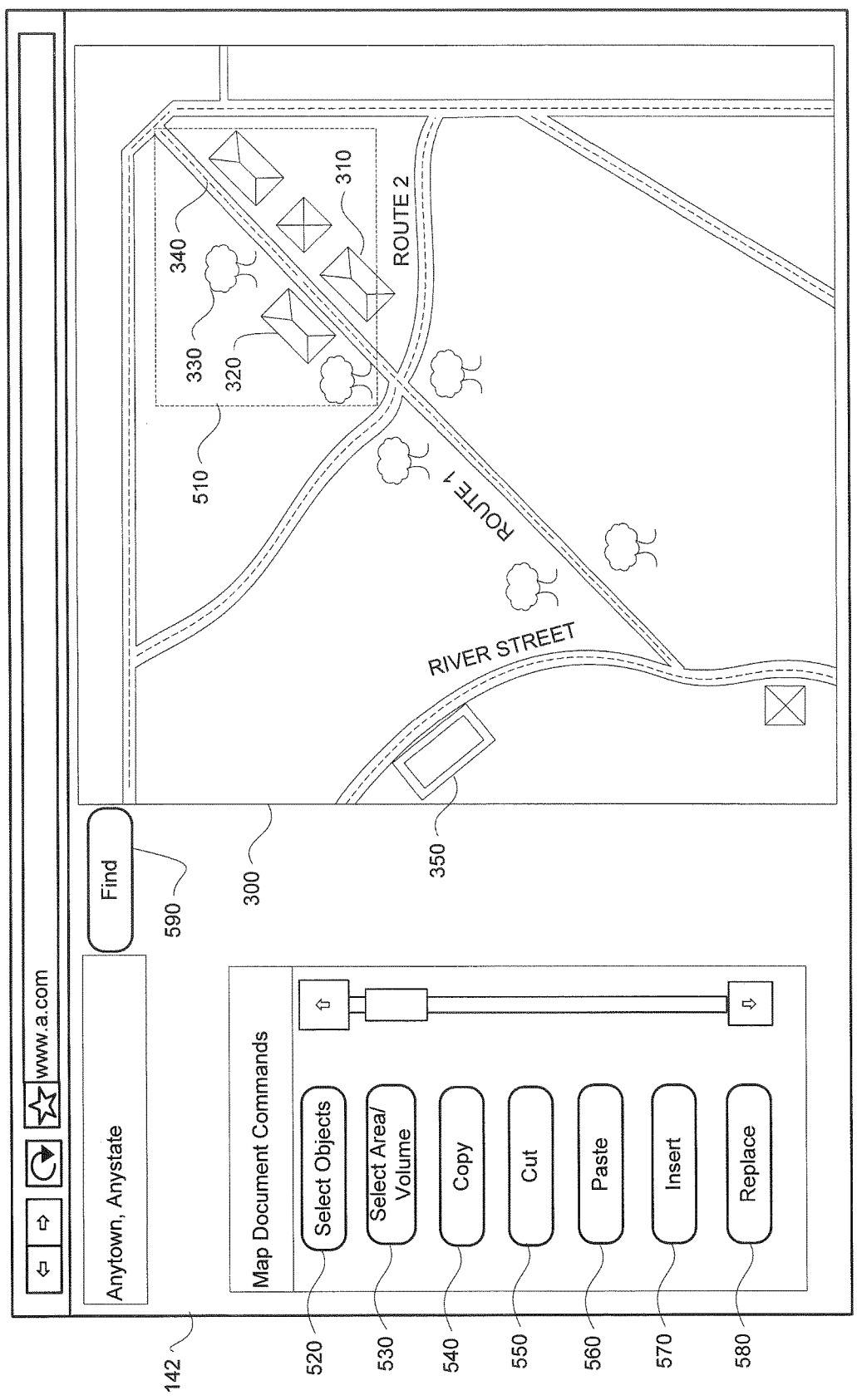
FIG. 5 shows a display of a map in accordance with one aspect of the disclosure.

In accordance with one aspect of the disclosure, a user may alter maps 300 and 400 using one or more commands. FIG. 5 shows a display of map 300 along with a variety of command icons 520-590. In one example, a user may copy a portion of map 300 and paste the copied portion into a different map. In selecting the portion to be copied from map 300, the user may select specific objects within the map, for example, using icon 520. In another example, the user may select an area or volume within the map, such as by using icon 530.

Upon selecting icon 530, a user may indicate an area within map 300 to be selected. For example, as shown in FIG. 5, the user may draw a perimeter, such as perimeter 510, to enclose the portion of map 300 that is to be selected. Once the area within perimeter 510 has been selected, the user may copy this selected area using copy icon 540. An indication may be provided to the user to confirm that the selected portion of the map has been copied. For example, the area within perimeter 510 may be highlighted on display 142. In performing the copy operation, the system may identify and store any map data associated with the copied portion of the map. The copied data may include the geographic location and orientation of the selected portion of the map, as well as data relating to any objects that are located within the copied portion of the map. For example, building 320 is located within perimeter 510. Accordingly, upon copying the area within perimeter 510, the system may copy not only image data for displaying building 320, but may also copy other information corresponding to building 320, such as the name, address, and telephone number of building 320.

Figure 6:
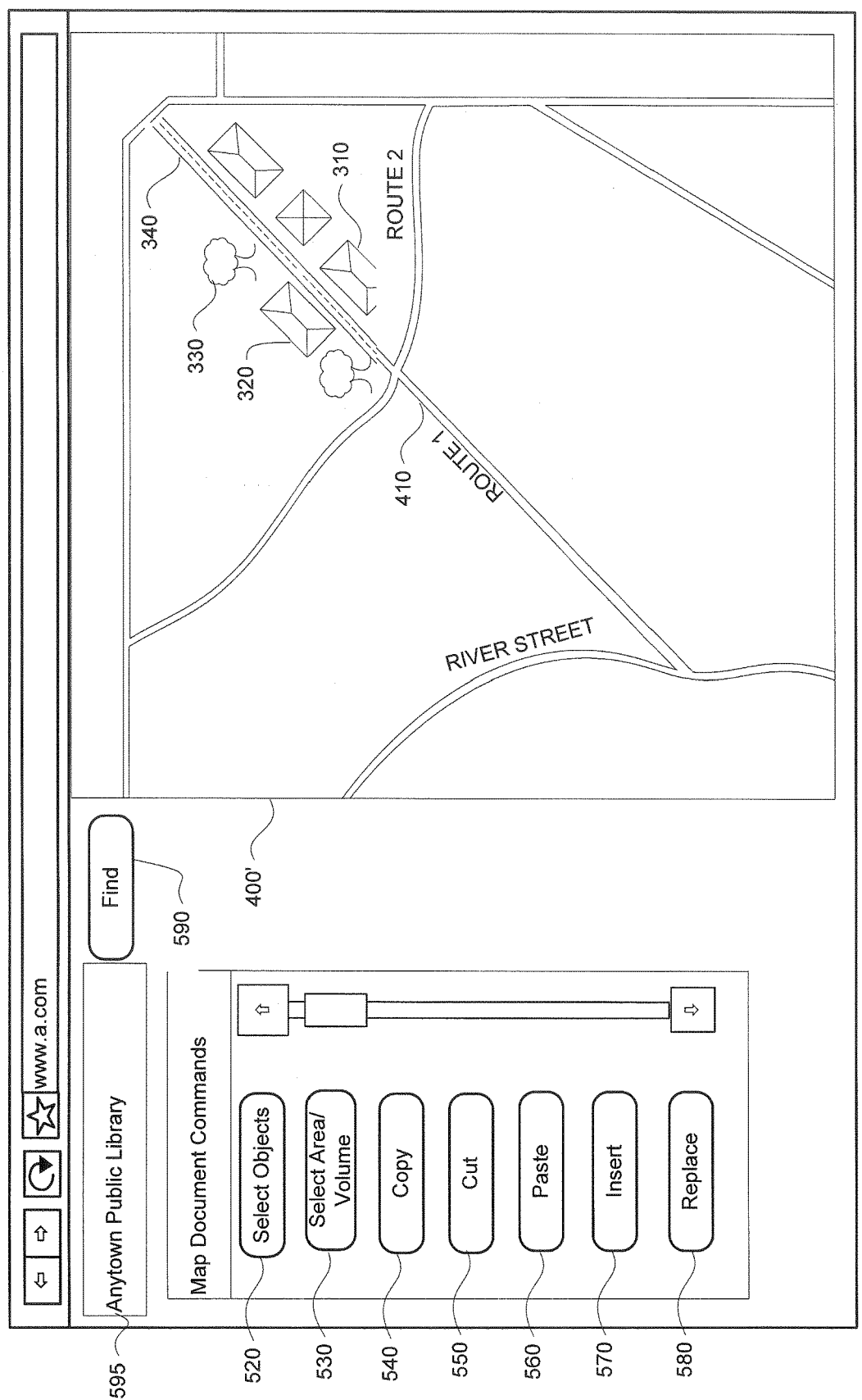
FIG. 6 shows a display of a map that has been altered in accordance with one aspect of the disclosure.

Once a portion of a first map has been copied, the user may then command the system to paste the copied portion of the first map into a second map. In performing the paste operation, the system may identify the geographic location and orientation within the second map that corresponds to the copied portion of the first map. The system may then replace the corresponding geographic location of the second map with the data that has been copied from the first map, so that the copied portion of the first map appears within the second map at the same location and orientation as it appeared in the first map. For example, FIG. 6 shows map 400' in which the copied portion of map 300 shown in FIG. 5 has been pasted into map 400 shown in FIG. 4. The user may perform this paste operation by accessing map 400 and selecting paste icon 560. However, the operations disclosed herein may also be performed without the user accessing or viewing map on the user's device. For example, if map 400 is stored on computing device 110 shown in FIG. 1, a user of computing device 120 may request that computing device 110 perform a paste operation within map 400 without computing device 120 having accessed or displayed map 400.

Upon the disclosed system performing the copy and paste operations described above, map 400 is altered to map 400' shown in FIG. 6. Map 400' includes various objects that were not present in map 400, such as tree 330 and building 320. In addition, the pasted portion from map 300 appears within map 400' at a location and orientation that corresponds to the location and orientation in which they appeared in map 300. Accordingly, each of the objects within the pasted portion also appears at their corresponding location and orientation. In addition, any data associated with these objects from map 300 may also be included in map 400'. For example, in pasting building 320 into map 400', the system may also add the name, address, and telephone number of building 320 as data that is associated with map 400'.

In addition to adding new objects to a map, the paste operation may also cause the removal of objects that were present in the map. In particular, an object that is present in map 400, but is not present in map 300, may be removed from map 400' if that object is located within the area that has been copied from map 300 and pasted into map 400. Similarly, the image of an object may be replaced with a different image in connection with the copy and paste operations described above. For example, as seen in FIG. 6, segment 340 of Route 1 that was copied from map 300 has a different appearance in comparison to segment 410 of Route 1.

As seen in FIG. 5, the copied area of map 300 does not include all of building 310. Accordingly, only the selected portion of building 310 is included in map 400'. However, in one alternative, the disclosed system may identify objects that are only partially within the copied area and copy the entire object from the map. In yet another alternative, the system may exclude any object from being copied if it is only partially within the copied area. Accordingly, under the former alternative, building 310 would appear in its entirety within map 400', while in the latter alternative, none of building 310 would appear within map 400'.

Figure 7:
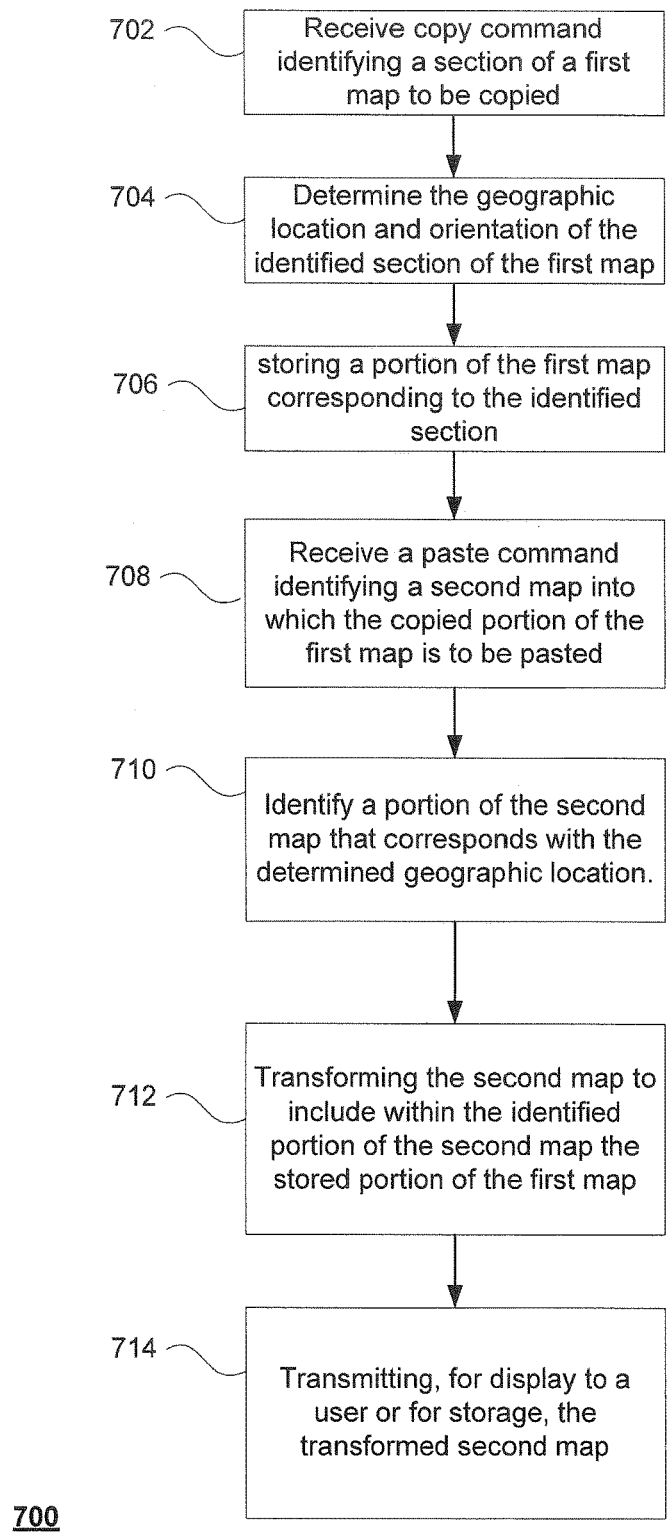
FIG. 7 is a flow chart in accordance with one aspect of the disclosure.

FIG. 7 shows a flow chart 700 for the example copy and paste operations described above. Each block shown in flow chart 700 may be performed by one or more computing devices that are included in the disclosed system. In addition, various blocks of the flow chart 700 may be performed in any order or simultaneously, with some blocks being added or omitted.

In block 702, a command, such as a copy or cut command, is received identifying a section of a first map to be copied. One or more computing device may then determine the geographic location and orientation of the identified section of the first map (block 704) and may store a portion of the first map corresponding to the section of the first map identified in the copy operation (block 706).

A paste command may then be received, which identifies a second map into which the copied portion of the first map is to be pasted (block 708). In performing the paste operation, the one or more computing devices may identify a portion of the second map that corresponds with the geographic location that was identified for the section of the first map (block 710).

In block 712, the second map is transformed to include the stored portion of the first map at the identified portion of the second map. As described above, the inclusion of the stored portion of the first map may occur by removing a portion of the second map and replacing the removed portion with the stored portion of the first map. In addition, the system may perform the paste operation so that the stored portion of the first map appears within the second map in orientation that corresponds to its orientation within the first map. The transformed second map may then be transmitted for display to a user (block 714), and be stored by a device on the system.

According to another example, a copied portion of a first map may be pasted into a second map at a location and in an orientation that does not correspond with the location and orientation in which the copied portion appeared in the first map. In this example, the user may identify the location and orientation in which the copied portion of the first map is to appear in the second map. For example, the user may direct a curser or other pointing device to identify a location and orientation within the second map into which the copied portion of the first map is to be pasted. Alternatively, the user may provide the system with geographic coordinates to identify the location for which the paste operation is to be performed.

Returning to FIG. 5, that figure shows a copy operation being performed for a two-dimensional area identified within perimeter 510. However, if map 300 is a three-dimensional map, the copy operation may occur for a three-dimensional volume that corresponds to the identified two-dimensional area. For example, the system may automatically extend perimeter 510 above and below the terrain shown in map 300, so as to create a three-dimensional volume. Any map data located within this three-dimensional may then be copied upon the user selecting copy icon 540.

In one example, the copy operation may be performed on a map that is presented as a part of a globe. In this instance, the three-dimensional volume that is copied from the map may take the form of a conic volume. For example, FIG. 8 shows a global map 810 in which a user has selected area 820 for copying. In performing a copy operation for area 820, the system may copy any map data that is located within the conic volume 830.

In determining the conic volume that corresponds to area 820, the system may place apex 840 of conic volume 830 at the center of the globe and may then use area 820 to define the boundaries of conic volume 830 as it extends from apex 840. Conic volume 830 may then extend out from apex 840 in this manner to the extent of the three-dimensional map. While area 820 is circular, the area selected by the user may take any shape, including polygonal areas or an area that is created by a series of curved lines. Accordingly, the conic volume need not have a circular cross-section, as the cross-section of the conic volume may be defined by the area that has been selected by the user. In performing the copy operation for a conic volume, the system may determine the location and orientation of the conic volume within the map from which it is being copied. Accordingly, once the conic-volume has been copied from a first map, it may then be pasted into a second map by replacing the map data that currently exists at a location in the second map that corresponds to the determined location from the first map.

Rather than determining a three-dimensional volume that corresponds to an area selected by the user, the system may also allow the user to directly select a three-dimensional volume within a map. For example, the user may select a volume within a three-dimensional map that consists of a series of polygons, or the user may select a spherical or domed volume within the map. The system may then copy any map data that exists within the volume that has been selected by the user.

In pasting a portion of a first map into a second map, the system may alter the appearance of one or more the objects that were copied from the first map so that they correspond to the type of map into which the objects are being pasted. In one instance, the first map may be a three-dimensional map, while the second map may be a two-dimensional map. Accordingly, the system may flatten any three-dimensional objects copied from the first map so that they appear as two-dimensional images in the second map.

Figure 9:
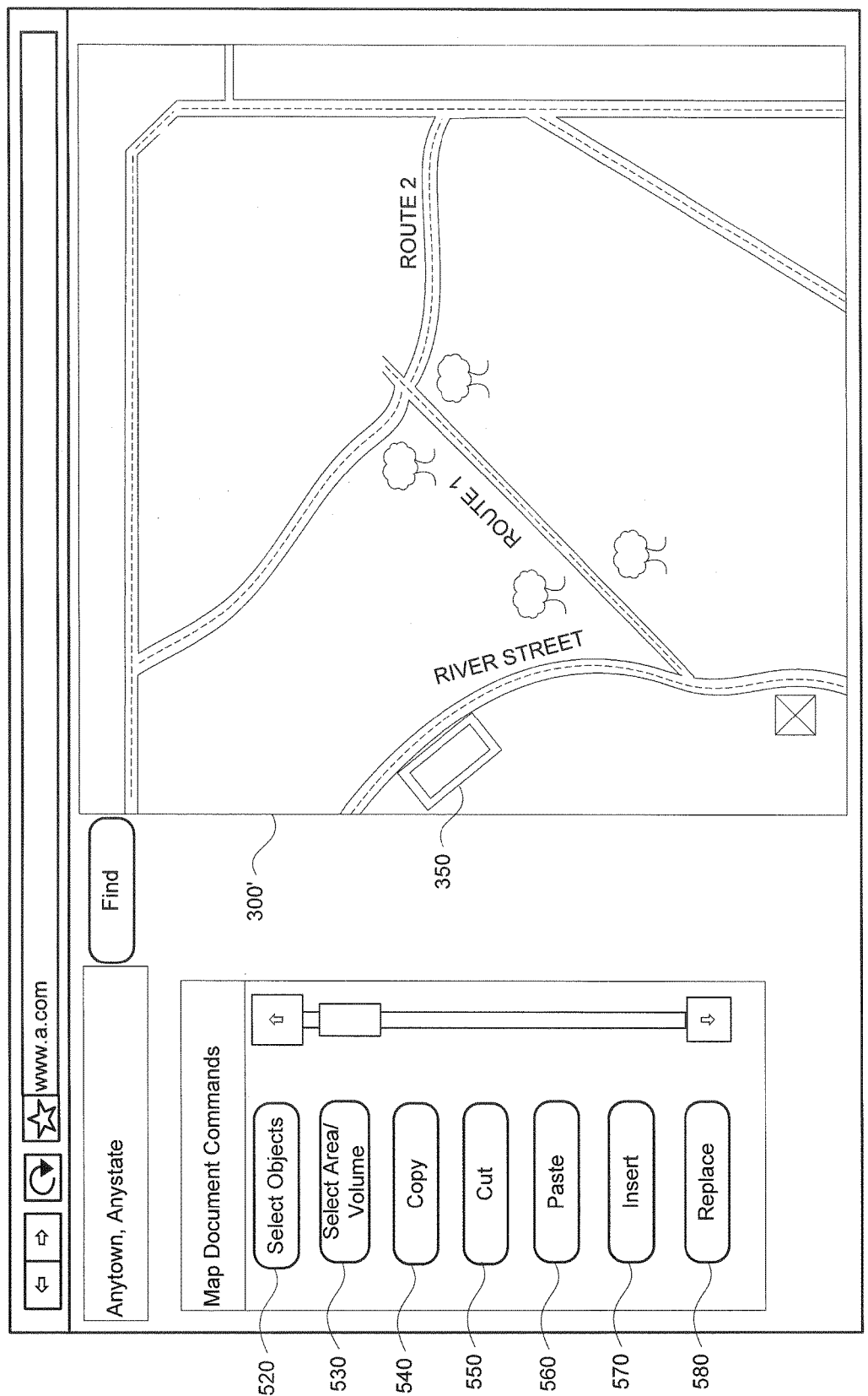
FIG. 9 shows an altered map in accordance with one aspect of the disclosure.

Returning to FIG. 5, map 300 is not altered upon the copy operation being performed, in that the copied portion of map 300 is not changed or removed from map 300. However, instead of selecting the copy icon 540, the user may select the cut icon 550 so as to perform a cut operation for the selected portion of map 300. The cut operation may act in the same manner as the copy operation described above, except that a cut operation may also cause map data to be removed from the selected portion of the map. In particular, the system may remove the selected objects, areas, or volumes from a map when performing a cut operation. For example, FIG. 9 shows a display of map 300' in which a cut operation has been performed on the area within perimeter 510 shown in FIG. 5. The portions of map 300 that were removed in the cut operation may then be pasted into a different map, in the same manner as described in connection with map 400' shown FIG. 6.

A cut operation may cause the system to remove all map data within the area or volume being cut, so that no objects or terrain are displayed within that area. However, in one alternative, the cut operation may remove certain objects within the area or volume being cut, while maintaining certain map graphics, such as graphics related to the map's terrain or roads. In addition, any area corresponding to an object that has been removed from the map may be replaced by a graphic that corresponds to the terrain in which the object is located. For example, map data may designate the terrain for building 320 shown in FIG. 5 may be grassland. Accordingly, a cut operation may cause the system to replace the image of building 320 with an image of grassland extending over the area of map 300' where building 320 was once located. As another example, a cut operation may be performed on an object that is located on water, such as a dock or a boat. In such an instance, the cut operation may replace the image of the dock or boat with an image of water.

Figure 10:
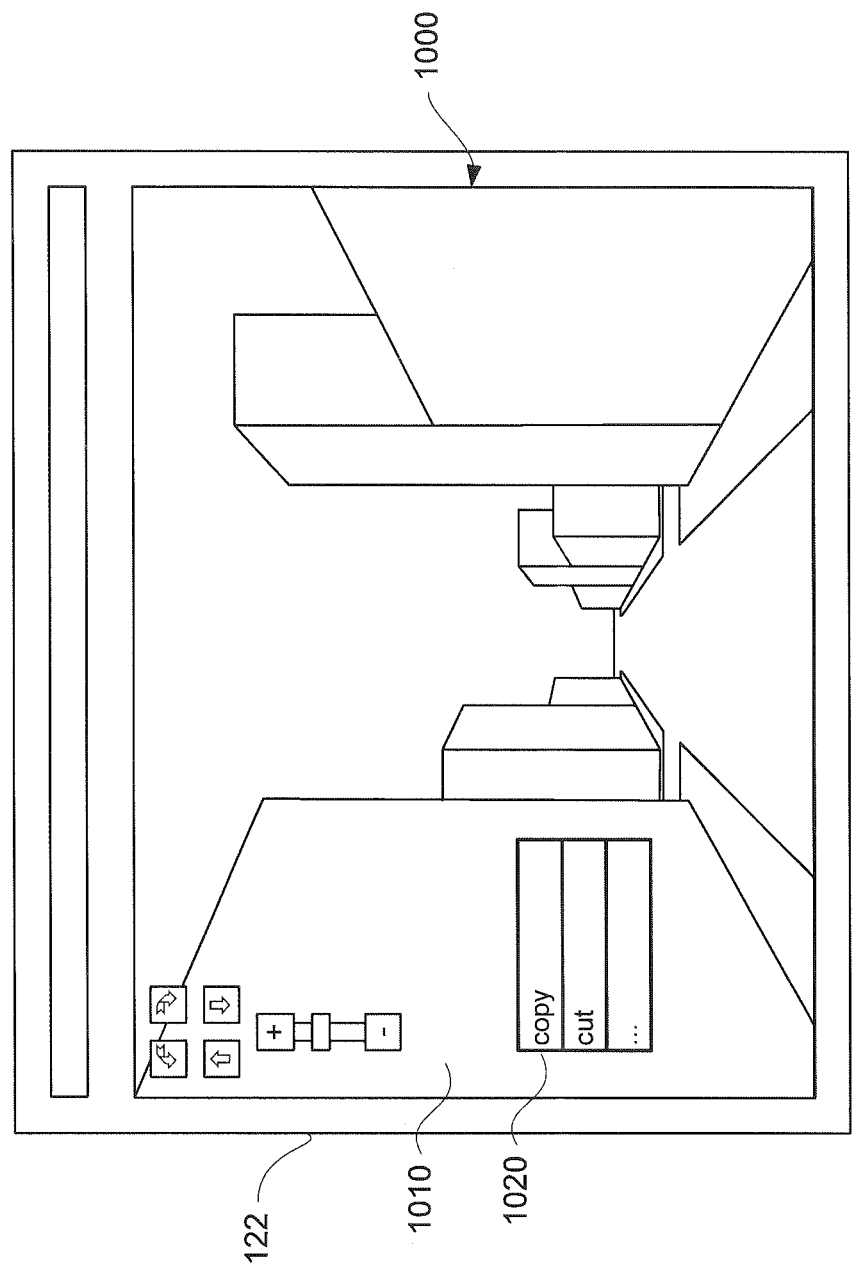
FIG. 10 shows a display in accordance with one aspect of the disclosure.

In another aspect of the disclosure, a user may perform an insert operation, rather than a paste operation, in connection with one or more maps. In performing the insert operation, such as by using icon 570, one or more selected objects may be placed into a map without removing a portion of the map into which the object is being placed. Instead, the inserted objects may be included as an additional layer of map data. As described above, a user may select objects from a map and perform a copy or cut operation on these selected objects. These copied or cut objects may then be placed into a map using an insert operation. For example, FIG. 10 shows a street-level view of map 1000 as viewed by a user on display 122. The user may select and copy building 1010. For example, where the map 1000 is displayed on a touch-screen, the selection of building 1010 with the user's finger may cause dropdown menu 1020 to appear. The user may then select the "copy" option from drop down menu 1020.

Figure 11:
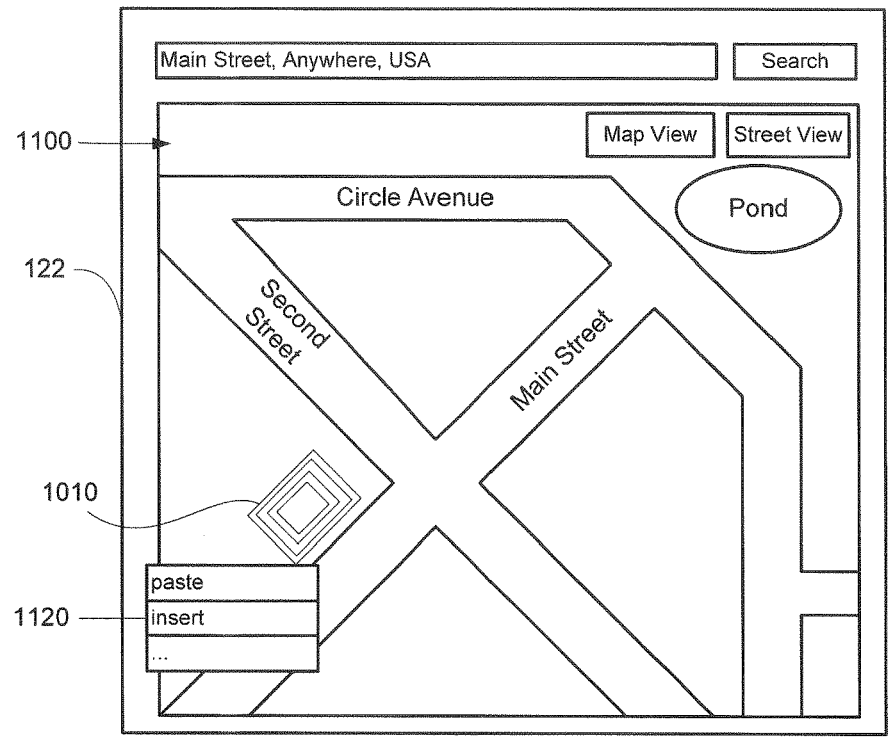
FIGS. 11 and 12 show altered maps in accordance with one aspect of the disclosure.
Figure 12:
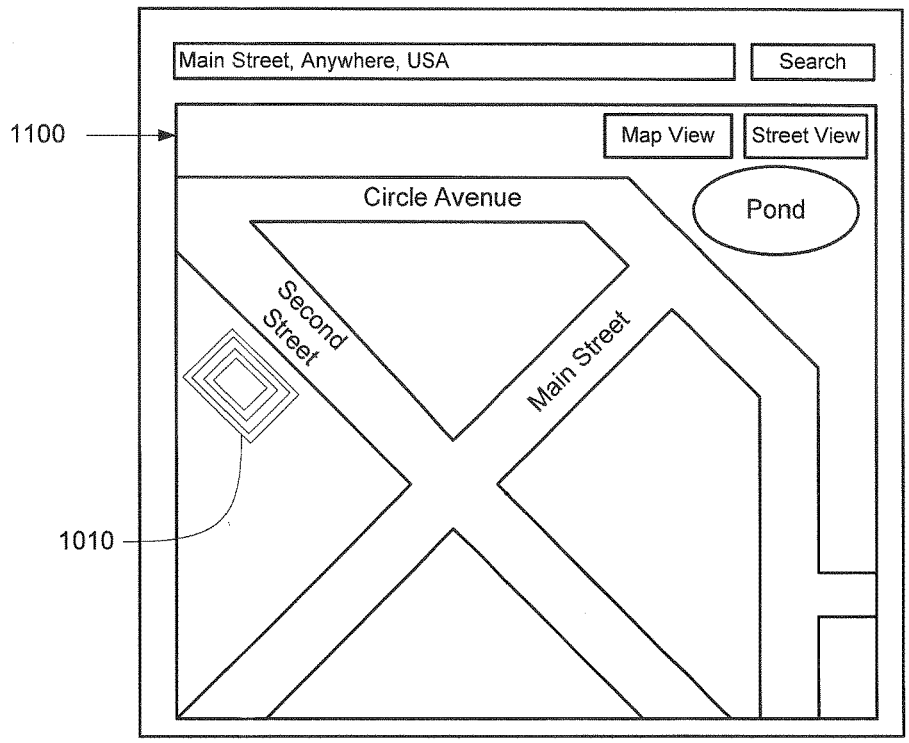

Once the user has copied building 1010, the user may then identify a second map into which the copied object is to be inserted. For example, the user may access map 1100 shown in FIG. 11. By selecting a point on map 1100 a dropdown menu 1120 may appear. The user may then select "insert" within the dropdown menu so as to insert building 1010 into map 1100. As described above in connection with the paste operation, building 1010 may be automatically placed within map 1100 at a geographic location and orientation that corresponds with the buildings location and orientation within map 1000. However, in one alternative, the user may select the location and orientation of building 1010. In addition, a user may move an inserted object within a map, such as by selecting and dragging the object, so as to change the inserted object's location and orientation. For example, FIG. 12 shows building 1010 after it has been moved within map 1100.

As described above, selected objects that are pasted or inserted into a particular map may be selected from one or more other maps. These objects may be referred to as map objects, as they are objects that are originally selected from a map. However, the selected objects that are inserted or pasted into a map may also be objects that are not selected from a map. These objects may be referred to as non-map objects. For example, a user may select a photographic image from the user's device, and insert the selected photographic image into a map. In another example, a user could select and copy a building from a three-dimensional computer model that is not a map. The user may then select a map into which the building from the three-dimensional model may then be inserted.

In another aspect of the disclosed system, a user may perform a find operation in connection with one or more maps, so as to identify objects within those maps. For example, a user may perform the find operation to identify specific objects within the map, such as particular roads or buildings. In addition, the find operation may be used to identify objects by their type, such as by performing a find operation for grocery stores or parks that are located within the map.

Figure 13:
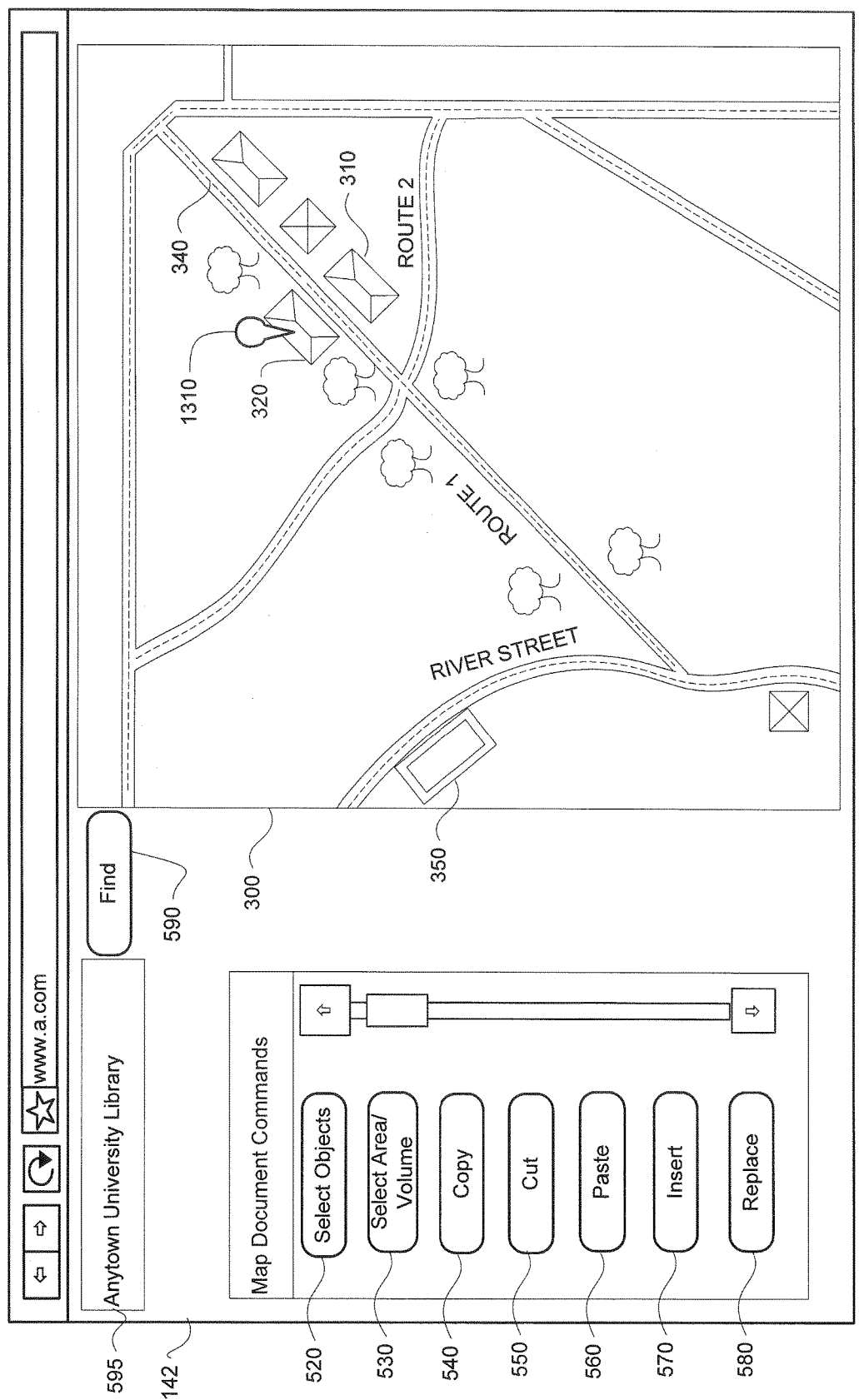
FIG. 13 shows a display of a map in accordance with one aspect of the disclosure.

A find operation may be performed by the user providing input into a text field. For example, as seen in FIG. 13, a user may type the phrase "Anytown University Library" into field 595. The user may then select icon 590 so as to perform a find operation for objects within map 300 that map the provided phrase. If map 300 contains data identifying building 320 as being Anytown University Library, the system may provide an indication to the user that the find operation has identified building 320 as satisfying the find request, such as by displaying marker 1310 over building 320. If a find operation identifies a plurality of objects within a map as matching the user's find request, then the system may provide an indication of a match for each of the plurality of objects. For example, if the user typed the term "library" into field 595 and selected icon 590, the system may display a marker over each library within map 300.

While FIG. 13 shows marker 1310 as indicating a match for the user's find request, the system may provide the user with any number of indicia to indicate that a match has been found. In one example, the system may highlight the objects that match the find request. For example, if the user typed "Anytown University" within field 595, the system may highlight the entirety of Anytown University's campus within map 300, including the various buildings located within Anytown University's campus. Once a find operation has been performed, the user may perform additional operations in connection with the objects that have been found. In particular, for each object identified by the find operation, the user may perform a copy or cut operation in the manner described above.

Figure 14:
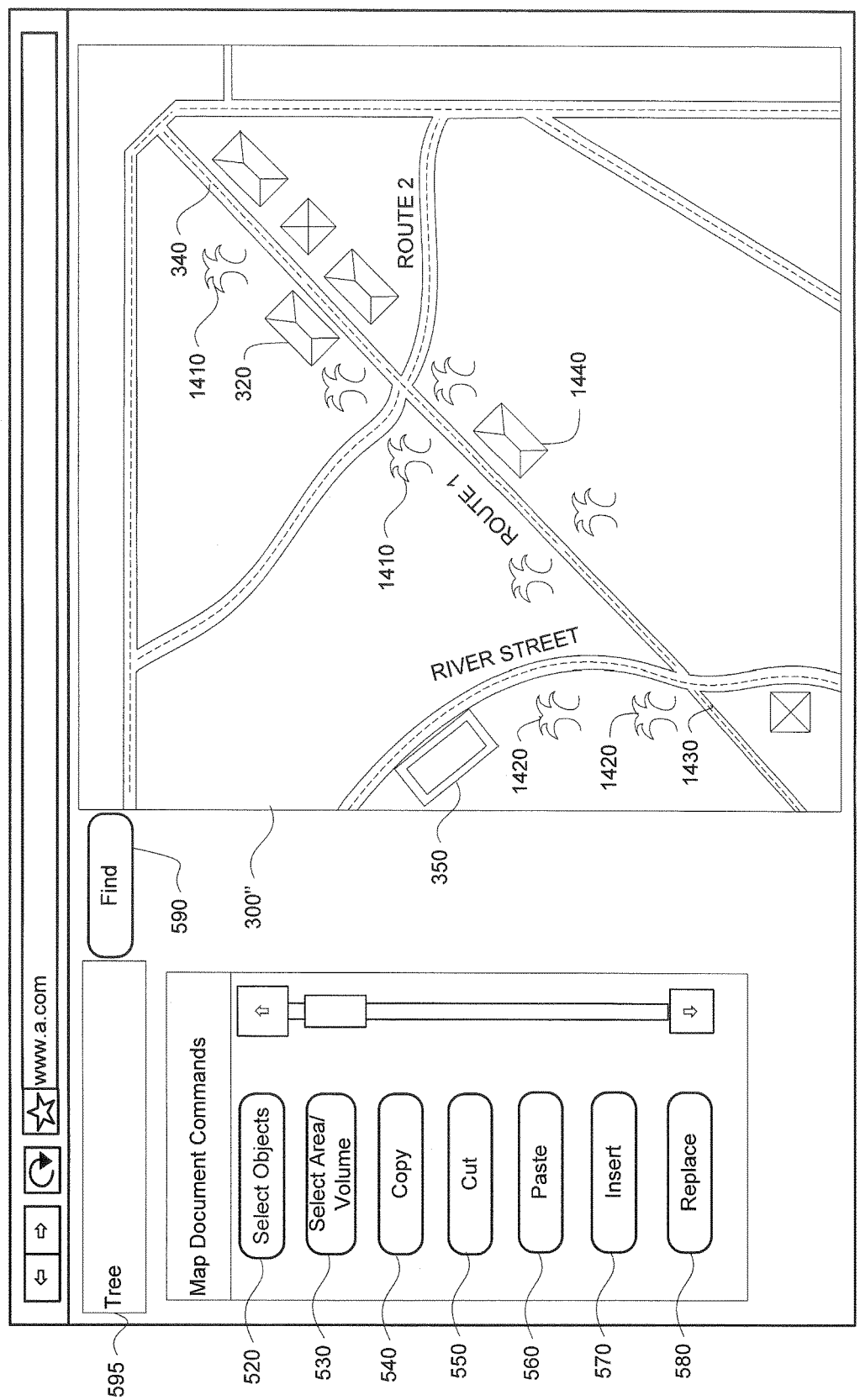
FIG. 14 shows a display of an altered map in accordance with one aspect of the disclosure.

In another aspect the system may perform a replace operation so as to replace objects in a map with other objects. For example, objects within map 300 shown in FIG. 5 may be replaced with other objects that have been selected by the user. FIG. 14 shows map 300" in which the images of trees from map 300 have been replaced with different trees 1410. As set described above, trees 1410 may have been selected from another map or from a computer model that is not a map. In replacing the trees from map 300, the user may first perform a find operation by typing "tree" into field 595, and then selecting icon 590. As described above, the system may identify all objects within map 300 that correspond to the find request. The user may then select icon 580 so as to replace the identified trees in map 300 with the selected images of trees 1410. As seen in FIG. 14, the user may also insert additional objects into map 300", including trees 1420, road segment 1430, and building 1440.

In performing the insert, paste, or replace operations described above, the system may determine whether objects being placed into the map are associated with other objects within the map. For example, in connection with the insertion of road segment 1430 into map 300", the system may identify road segment 1430 as being an extension of Route 1. In addition, the system may identify building 1440 as being a part of Anytown University. Data indicating these associations may be stored in connection with map 300" for use in later operations. For instance, a find operation for "Route 1" within map 300" would include an identification of road segment 1430. Similarly, the system may identify building 1440 to a user in connection with a find operation for "Anytown University."

Using the operations described above, a user may alter the appearance of a map. Once a map has been altered, the disclosed system may store the altered maps for later access by users. Returning to FIG. 1, the storage of a map may occur locally on client devices 120, 140, and 150, as well as on remote devices, such as computing device 120 and storage system 150. In one aspect, the altered map may be stored as a different version of the original map. For example, as described above, map 400 shown in FIG. 4 may be altered to map 400' shown in FIG. 6. Accordingly, user may request that the system store map 400' as a separate version of map 400, so that map 400 and map 400' may each be accessed on the disclosed system. With map 400' being identified within the system as a version of map 400. Alternatively, the user may replace map 400 with map 400', so that only map 400' remains stored on the system.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present invention as defined by the appended claims.

The invention claimed is:

1. A method comprising:
   receiving, by one or more computing devices, a first selection of a first portion from a first geographical map, the first portion including at least one map object, the at least one map object being an object originally selected from the first geographical map;
   receiving, by the one or more computing devices, a second selection indicating a second geographical map into which the first portion from the first map, including the at least one map object, is to be included;
   determining, by the one or more computing devices, a geographic location and an orientation of the first portion from the first map;
   identifying, by the one or more computing devices, a second portion of the second map that corresponds with the geographic location of the first portion from the first map; and
   incorporating, by the one or more computing devices, the first portion from the first map into the second portion of the second map, wherein the incorporating occurs in an orientation that corresponds with the determined orientation of the first portion from the first map so that the at least one map object appears at a same orientation as in the first map.

2. The method of claim 1, further comprising:
   identifying, by the one or more computing devices, one or more objects within the portion from the first map; and
   removing, by the one or more computing devices, the one or more objects from the first map.

3. The method of claim 1, wherein the portion from the first map is selected in response to a user selection of an area within the first map.

4. The method of claim 1, wherein the portion from the first map is selected in response to a user selection of a given one of the at least one map objects within the first map.

5. The method of claim 1, wherein:
   the first map and the second map are globes;
   the determining step includes associating the portion from the first map with a conic volume having an apex located toward the center of the globe of the first map;
   the identifying step includes identifying a conic volume of the second map that corresponds with the conic volume of the first map; and
   the incorporating step includes incorporating the conic volume of the first map into the conic volume of the second map.

6. The method of claim 1, wherein the first map is a three-dimensional map, and wherein the first selection of the portion from the first map includes a three-dimensional volume from the first map.

7. The method of claim 1, wherein incorporating the first portion from the first map into the second portion of the second map further comprises:
   removing the second portion from the second map; and replacing the second portion with the first portion from the first map.

8. The method of claim 1, wherein incorporating the first portion from the first map into the second portion of the second map generates an altered map; and further comprising, storing, by the one or more computing devices, the altered map as a version of the second map.

9. The method of claim 1, wherein the at least one map object comprises a plurality of map objects, a given one of the plurality of map objects being only partially within the first selection of the first portion; and the method further comprises the one or more computing devices excluding the given map object from being incorporated into the second map.

10. The method of claim 1, further comprising the one or more computing devices altering an appearance of the at least one map object so that the at least one map object corresponds to a type of map into which the at least one object is being incorporated.

11. A method comprising:

receiving, by one or more computing devices, a selection of one or more selected objects, the one or more selected objects being map objects originally selected from a particular geographical map;

receiving, by the one or more computing devices, a request for an identification of one or more map objects within a first geographical map;

identifying, by the one or more computing devices, the one or more map objects within the first map;

receiving, by the one or more computing devices, a request to replace the one or more map objects with the one or more selected objects; and replacing, by the one or more computing devices, the one or more map objects in the first map with the one or more selected objects based on the received request.

12. The method of claim 11, wherein the request for the identification of the one or more map objects is based on a search query provided by a user of the one or more computing devices.

13. The method of claim 11, wherein replacing the one or more map objects further comprises:

determining that the one or more map objects share an association with one or more non-identified objects within the first map; and incorporating the one or more selected objects into the first map so that the one or more selected objects share the association with the one or more non-identified objects within the first map.

14. The method of claim 11, wherein replacing the one or more map objects with the one or more selected objects generates an altered map; and further comprising storing, by the one or more computing devices, the altered map as a version of the first map.

15. A system comprising one or more processors configured to:

receive a first selection of a first portion from a first geographical map, the first portion including at least one map object, the at least one map object being an object originally selected from the first geographical map;

receive a second selection indicating a second geographical map into which the first portion from the first map, including the at least one map object, is to be included;

determine a geographic location and an orientation of the first portion from the first map;

identify a second portion of the second map that corresponds with the geographic location of the first portion from the first map; and incorporate the first portion from the first map into the second portion of the second map, wherein the incorporating occurs in an orientation that corresponds with the determined orientation of the first portion from the first map so that the at least one map object appears at a same orientation as in the first map.

16. The system of claim 15, wherein the processor is further configured to:

identify one or more objects within the portion from the first map; and remove the one or more objects from the first map.

17. The system of claim 15, wherein the portion from the first map is selected in response to a user selection of an area within the first map.

18. The system of claim 15, wherein the portion from the first map is selected in response to a user selection of a given one of the at least one map objects within the first map.

19. The system of claim 15, wherein:

the first map and the second map are globes;

determining a geographic location and an orientation of the first portion includes associating the portion from the first map with a conic volume having an apex located toward the center of the globe of the first map;

identifying a second portion of the second map that corresponds with the geographic location of the first portion includes identifying a conic volume of the second map that corresponds with the conic volume of the first map; and incorporating the first portion from the first map into the second portion of the second map includes incorporating the conic volume of the first map into the conic volume of the second map.

20. The system of claim 15, wherein the first map is a three-dimensional map, and wherein the first selection of the portion from the first map includes a three-dimensional volume from the first map.

21. The system of claim 15, wherein incorporating the first portion from the first map into the second portion of the second map further comprises:

removing the second portion from the second map; and replacing the second portion with the first portion from the first map.

22. The system of claim 15, wherein incorporating the first portion from the first map into the second portion of the second map generates an altered map, and wherein the processor is further configured to store the altered map as a version of the second map.

* * * * *